United States Patent [19]
Head et al.

[11] 3,773,656
[45] Nov. 20, 1973

[54] PROCESS FOR HYDROCARBON CRACKING USING A TUNGSTEN-RHENIUM CATALYST

[75] Inventors: Billy Duane Head, Angleton; George Robert Martin, Freeport, both of Tex.

[73] Assignee: The Dow Chemical Company, Midland, Mich.

[22] Filed: Dec. 1, 1971

[21] Appl. No.: 203,832

[52] U.S. Cl. ............... 208/111, 252/458, 252/465, 252/467
[51] Int. Cl. .......................................... C10g 13/06
[58] Field of Search ................. 208/111; 252/455, 252/458, 465, 467

[56] References Cited
UNITED STATES PATENTS

| | | | |
|---|---|---|---|
| 3,215,617 | 11/1965 | Burch et al. | 208/59 |
| 3,536,605 | 10/1970 | Kittrell | 208/59 |
| 3,536,606 | 10/1970 | Kittrell | 208/59 |
| 3,535,231 | 10/1970 | Kittrell | 208/60 |
| 3,535,233 | 10/1970 | Jaffe | 208/111 |
| 3,535,229 | 10/1970 | Jaffe | 208/59 |

Primary Examiner—Delbert E. Gantz
Assistant Examiner—G. E. Schmitkons
Attorney—William M. Yates et al.

[57] ABSTRACT

Heavy hydrocarbon feed oils such as heavy gas oils, residium, topped crude oils and the like are hydrocracked by mixing hydrogen with the feed oil in the ratio of hydrogen to feed oil in the range from 4000 to 10,000 SCF of hydrogen per barrel of feed oil and contacting this mixture under hydro-treating conditions with a supported micro-spherical catalyst having 5–20 weight per cent tungsten and 0.5 to 5.0 weight per cent rhenium. Increased isoparaffin and aromatic content in the cracked product is obtained.

7 Claims, No Drawings

PROCESS FOR HYDROCARBON CRACKING USING A TUNGSTEN-RHENIUM CATALYST

BACKGROUND OF THE INVENTION

This invention relates to a process for hydrocracking a heavy hydrocarbon feed oil by catalytic hydrogenation using a tungsten-rhenium catalyst.

Various metals or combinations thereof have been used as catalysts to hydrogenate hydrocarbons. Thus, rhenium-tin, rhenium, silver-rhenium platinum-rhenium, or palladium-rhenium are known. These catalysts and processes using them are described in one or more of the following U.S. Pats: 3,215,617; 3,278,418; 3,415,737; 3,523,914; 3,535,229; 3,535,230; 3,535,231; 3,535,233; 3,535,272; 3,536,606; 3,598,723 and 3,600,301.

However, none of the foregoing patents suggest and sepcifically show that a tungsten-rhenium catalyst is useful to crack heavy hydrocarbons into lower boiling components having increased isoparaffin and aromatic content.

SUMMARY OF THE INVENTION

It has now been discovered that heavy hydrocarbon feed oils with an initial boiling point of 760° F or greater can be hydrocracked over a microspherical catalyst having disposed thereon about 10 to 25 weight percent tungsten and about 0.5 to 5 weight percent rhenium.

Thus, the present invention relates to a process for hydrocracking a heavy hydrocarbon feed oil with the production of lower boiling components having increased isoparaffin and aromatic content which comprises subjecting said feed oil in the vapor phase to contact at hydrocracking conditions in the presence of hydrogen and a microspherical catalyst comprising an amorphous-refractory support having disposed thereon in intimate admixture about 10 to 25 weight percent tungsten and about 0.5 to 5 weight percent rhenium.

More specifically, the steps of the process comprise 1) mixing the feed oil with hydrogen or a gas containing hydrogen at a ratio in the range from 4,000 to 10,000 and preferably 6,000 to 8,000 standard cubic feet of hydrogen per barrel of feed oil, 2) passing the mixture upwardly through a reaction zone at a liquid hourly space velocity in the range from 0.5 to 2.5 and preferably 0.75 to 1.25 wherein the reaction zone has a temperature in the range from 425° C to 550° C and preferably 475° C to 500° C, a pressure in the range from 500 to 5,000 psig and preferably 2,000 to 3,000 psig, a microspherical catalyst comprising about 5 to 20 weight percent tungsten and about 0.5 to 5 weight rhenium and preferably 13 to 20 percent by weight tungsten and 2 to 5 percent by weight rhenium on an amorphous refractory support and 3) recovering lower boiling components of the feed oil having increased isoparaffin and aromatic content.

The products of the process are useful as a superior gasoline blend stock due to their higher isoparaffin and aromatic content.

DETAILED DESCRIPTION

The process of this invention is applicable to the hydrocracking of well known heavy hydrocarbon feedstocks such as heavy gas oil, residuum, topped crude oils, and the like.

In the process, pure hydrogen gas can be used or an impure recycle stream of hydrogen gas can be used containing other gases such as methane, carbon dioxide and the like as long as the indicated proper ratio of hydrogen to hydrocarbon is maintained in the mixture going into the hydrogenation zone.

The pressure used during the hydrogenation step can vary from 500 to 5,000 psig with a range from 2,000 to 3,000 psig being preferred.

The temperature in the hydrogenation zone is maintained in the range from 425° C to 550° C and preferably in the range 475° C to 500° C.

The hydrocarbon feed oil is mixed with a hydrogen containing gas at a ratio in the range from 4,000 to 10,000 standard cubic feet (scf) of hydrogen per barrel of feed oil and preferably in the range from 6,000 to 8,000 scf per barrel.

The above mixture is passed upwardly through the catalyst in the hydrogenation zone at a liquid hourly space velocity (LHSV) range of 0.5 to 2.5 and preferably 0.75–1.25.

The catalysts used in this process can be prepared by conventional catalyst preparatory techniques i.e., by depositing a mixture of tungsten and rhenium salts or compounds in water or an organic solvent on an amosphous refractory support such as alumina, titania, zirconia, chromia, magnesia, thoria, boria, silica-alumina, silica-magnesia and the like.

The impregnated catalyst is then dried at 100°–150° C for about 10–20 hours and then reduced at 500°–600° C for 3–9 hours.

Useful soluble tungsten compounds that can be used are ammonium metatungstate, tungstic acid, tungsten hexachloride, tungsten oxychloride, and the like.

Useful soluble rhenium compounds that can be used are perrhenic acid, rhenium tetraoxide, rhenium heptaoxide, and the like.

The catalyst support used is in the form of microspheres and should have a surface area in the range from 400 to 600 square meters per gram and an average particle size in the range from 25 to 75 microns.

The finished catalysts have a metallic content of 5 to 20 weight percent tungsten and about 0.5 to 5 weight percent rhenium and preferably in the range from 13 to 20 tungsten and 2 to 5 percent rhenium.

After the hydrogen-hydrocarbon mixture passes through the reaction zone, the effluent is cooled in a water condenser or similar apparatus to a temperature in the range from 25° to 30° C whereby a product is condensed which has an increased isoparaffin and aromatic content.

The invention is further illustrated by the following non-limiting examples.

EXAMPLE

Hastings residuum having an initial boiling point of 760° F was pumped through a preheater and upwardly through the reactor at the rate of 100 ml/hour to give a LHSV of 1.0 as the reactor contained 100 ml of catalyst. Hydrogen was added to the residium, just before it entered the preheater, in the amount of 7,000 scf/bbl. The preheater was maintained at about 350° C and the reactor at 500° C. The catalyst was 19 percent $WO_3$ - 4 percent Re on silica-alumina microspheres. Reactor pressure was maintained at 2,200 psig. The product was cooled and sent to a high pressure separator where primarily the $H_2$ and $CH_4$ were removed from the liquid. The liquid then went to a low pressure separator where the light gases were removed and the liquid product was collected.

Four runs were conducted and the percent yields of methane, normal paraffins, isoparaffins, naphthenes and aromatics are given in Table I.

TABLE I

| Run No. | Methane | N-paraffin | I-paraffin | Naphthene | Aromatic |
|---|---|---|---|---|---|
| 1 | 6.45 | 25.22 | 13.55 | 5.91 | 10.43 |
| 2 | 5.17 | 41.60 | 14.17 | 10.84 | 13.18 |
| 3 | 5.83 | 42.91 | 18.33 | 12.16 | 11.42 |
| 4 | 9.14 | 42.70 | 17.74 | 13.73 | 10.34 |
| Avg. of 4 runs | 6.64 | 38.1 | 15.94 | 10.65 | 11.34 |

For comparison, the above procedure was repeated using 19 percent tungsten oxide, 4 percent metallic rhenium, and a 6 percent nickel oxide - 19 percent tungsten oxide catalysts made on the same support used above and under substantially the same conditions.

The average percent yield based on four runs of the W catalyst, five runs of the Re catalyst, and three runs of the Ni-W catalyst, are given in Table II.

TABLE II

| Catalyst | Methane | N-paraffin | I-paraffin | Naphthene | Aromatic |
|---|---|---|---|---|---|
| 19% WO$_3$-4% Re | 6.6 | 38.1 | 15.9 | 10.6 | 11.3 |
| (based on data given in Table I) | | | | | |
| 19% WO$_3$ | 7.2 | 37.4 | 12.0 | 10.2 | 6.0 |
| 4% Metallic Re | 6.3 | 44.5 | 18.8 | 11.3 | 9.8 |
| 6% NiO-19% WO$_3$ | 7.4 | 35.3 | 13.2 | 9.3 | 8.6 |

A comparison of the above data reveals that the tungsten-rhenium catalysts of this invention significantly improve the yields of aromatics and/or isoparaffins over the well known nickel-tungsten catalyst and even improve the yield of aromatics over a similar rhenium catalyst.

We claim:

1. A process for hydrocracking a heavy hydrocarbon feed oil with a boiling point greater than 760° F with the production of lower boiling components having increased isoparaffin and aromatic content which comprises subjecting said feed oil to contact at hydrocracking conditions and in the presence of hydrogen with a microspherical catalyst consisting essentially of an amorphous refractory support having disposed thereon in intimate admixture about 5 to 20 weight percent tungsten and about 0.5 to 5 weight percent rhenium.

2. The process of claim 1 wherein said catalyst contains 13 to 20 percent by weight of tungsten and 2 to 5 percent by weight of rhenium.

3. A process for hydrocracking a heavy hydrocarbon feed oil with a boiling point greater than 760° F with the production of lower boiling components having increased isoparaffin and aromatic content which comprises A mixing said feed oil with a gas containing hydrogen at a ratio in the range from 4,000 to 10,000 standard cubic feet of hydrogen per barrel of feed oil, B passing said mixture upwardly through a reaction zone at a liquid hourly space velocity in the range from 0.5 to 2.5 wherein the reaction zone has a temperature in the range from 425° C to 550° C and a pressure in the range from 500 to 5,000 psig and a microspherical catalyst comprising about 5 to 20 weight percent tungsten and about 0.5 to 5 weight percent rhenium on an amorphous refractory support wherein said mixture has a velocity sufficient to fluidize said catalyst and C recovering lower boiling components of the feed oil having increased isoparaffin and aromatic content.

4. A process as set forth in claim 3 wherein said catalyst contains 13 to 20 percent by weight of tungsten and 2 to 5 percent by weight of rhenium.

5. A process as set forth in claim 3 wherein the gas containing hydrogen is used at a ratio in the range from 2,000 to 8,000 standard cubic feet of hydrogen per barrel of feed oil, the temperature of the reaction zone is in the range from 475° C to 500° C, the pressure of the reaction zone is in the range from 2,000 to 3,000 psig, and the space velocity is in the range from 0.75 to 1.25.

6. A process as set forth in claim 5 wherein said catalyst contains 13 to 20 percent by weight of tungsten and 2 to 5 percent by weight of rhenium.

7. A process as set forth in claim 6 wherein said refractory support is a silica alumina support.

* * * * *